Patented Aug. 8, 1933

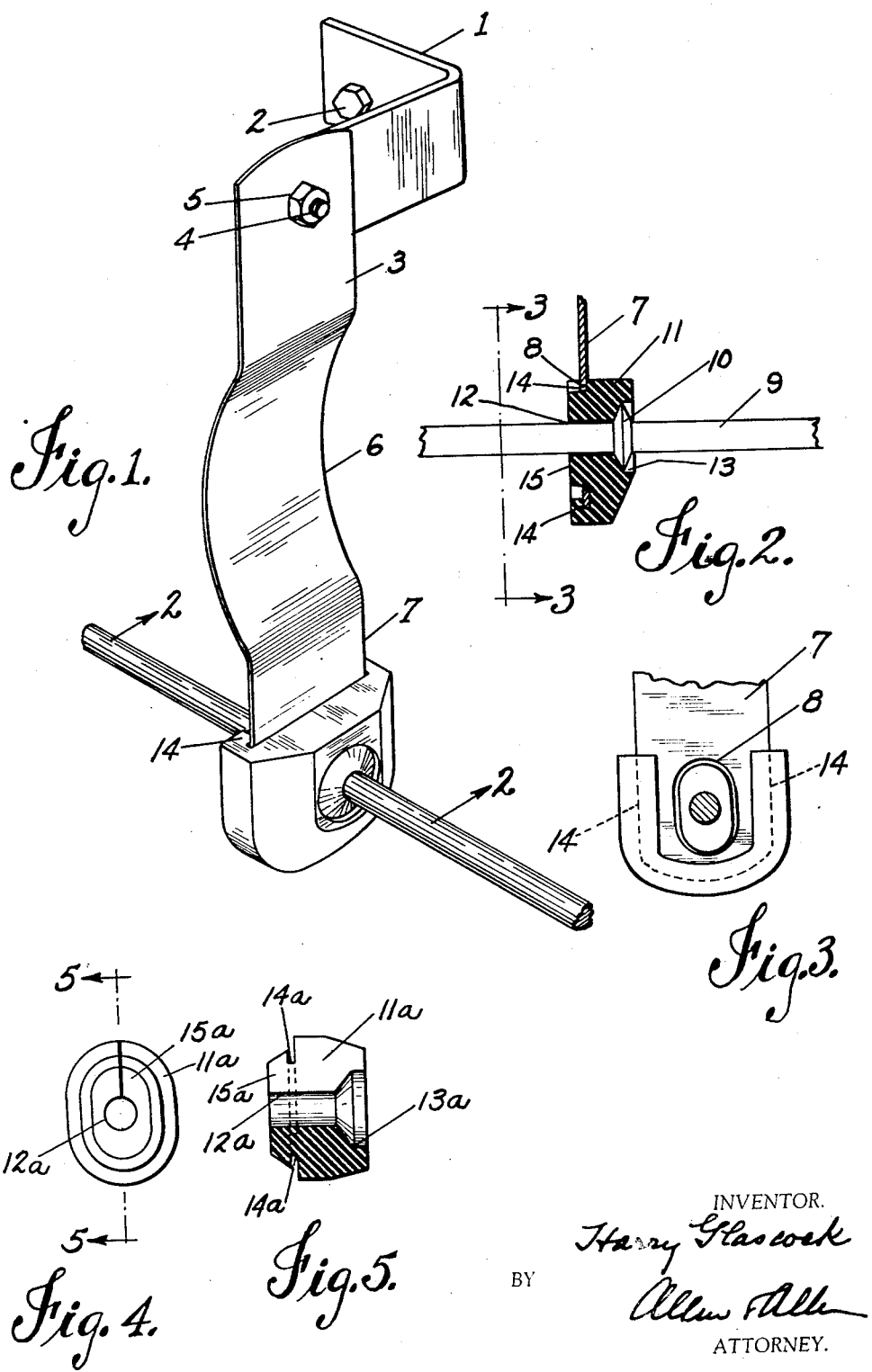

1,921,028

UNITED STATES PATENT OFFICE 1,921,028

BRAKE ROD SUPPORT

Harry Glascock, Cincinnati, Ohio, assignor to The P O B Manufacturing Company, Cincinnati, Ohio, a Corporation of Ohio Application August 28, 1931. Serial No. 559,982

8 Claims. (Cl. 188—205)

My invention relates to brake rod supports, and is particularly adapted for use supporting the brake rods of the light automobiles, having a flange on the brake rod.

It is the object of my invention to provide a brake rod support particularly for small automobiles, which will prevent the rattling of the brake rod within the support. Some of the smaller automobiles as standard equipment, are provided with a resilient plate secured to the chassis frame. The plate has an opening in its end through which the brake rod passes and the metal surrounding the opening is crimped outwardly, forming the recessed pocket into which the flange on the brake rod fits. This construction results in a more or less rigid assembly which frequently breaks off at one of the bends in the resilient plate, and with wear, a very decided rattle frequently results which permits the brake pedal to stay slightly on often causing the circuit to the stop light to stay closed.

It is the object of my invention to provide a brake rod support which will be more resilient than the standard support, which will hold the rod cushioned against rattling against the sides of the opening in the support and which will cause the full return of the brake pedal thereby eliminating any chance of the stop light remaining on.

The above objects I specifically accomplish by providing a rubber or resilient pad attached to a resilient support and in which the pad or plug has an opening through which the brake rod passes, and a countersunk recess which receives the flange on the brake rod and holds it in non-rattling position.

The above objects and other objects to which reference will be made in the ensuing description, I accomplish by that certain combination and arrangement of parts of which I have shown a preferred embodiment.

Referring to the drawing:—

Figure 1 is a perspective view of the brake rod support showing a section of the brake rod in position, passing through the resilient plug in the support.

Figure 2 is a sectional view taken along the line 2—2 in Figure 1.

Figure 3 is a sectional view taken along the lines 3—3 in Figure 2.

Figure 4 shows a modified type of resilient plug.

Figure 5 is a sectional view of the plug shown in Figure 4, taken along the lines 5—5.

Referring first to Figure 1, I have shown an angle bracket 1, which may be mounted on the chassis of the machine by means of a bolt, such as is indicated at 2. Bolted to the bracket 1, I have shown a resilient supporting plate 3, which may be suitably secured to the bracket 1, as by a bolt 4 and nut 5.

The plate 3 has a concave bent portion 6, and the end 7 through which the brake rod passes, is provided with an opening 8, such as is indicated in Figures 2 and 3.

The brake rod 9 has a peripherally flanged rib 10 which in the type of support provided, as standard equipment on some of the smaller automobiles, seats within an outwardly crimped pocket, which has a hole through which the brake rod passes.

My preferred type of resilient or rubber plug is indicated at 11, and as shown it has an opening 12 of suitable size to receive the brake rod. The plug has a countersunk recess 13, which receives the flanged rib 10 of the brake rod 9.

To secure the plug on the end of the support 7, channel portions 14 are provided which engage the walls of the ends 7 of the support. The plug has a tubular portion 15 which extends through and fits snugly against the walls surrounding the opening 8.

In Figures 4 and 5, I have shown a slightly different type of plug, which has a main body 11a, an opening 12a and a recessed pocket 13a. Channels 14a are provided extending from the tubular portion 15a. The channel portion 14a engages the walls surrounding the opening 8 instead of, as in the modification shown in Figures 1 to 3, engaging the outer edges of the walls of the portion 7.

The movement of the brake rod 9 is substantially about three eighths of an inch, so that there is sufficient play in the metal piece due to the convex bent portion 6, to allow for this movement. The flanged rib 10 is received snugly within the recessed portion 13 or 13a, and the rod 9 is held in shock absorbed position within the opening 12 or 12a in the plug.

In inserting the brake rod through the support, the rod is merely pushed directly through the rubber plug and the opening in the plug is sufficient and will stretch sufficiently to permit the flange to pass through the opening and seat in the recessed pocket.

As far as I am advised, the defect in the standard equipment provided on some of the smaller automobiles in permitting rattling of the brake rod in its support, has been recognized and a number of modifications have been suggested tending to eliminate the frequent breaking of the support and the developing of rattles. No one has previously suggested the use of a rubber plug having a recess for receiving the flange of the brake rod, and I claim the same broadly herein.

Having thus described my invention, what I claim as new and desire to secure by Letters Patent is:

1. A support for the brake rod of an automobile of the character specified comprising in combination a flexible support provided with means for attachment to the chassis of an automobile frame, said support having an opening of substantially larger size than the brake rod, and a resilient plug having an opening for slidably receiving said brake rod secured to said support.

2. A support for the brake rod of an automobile said brake rod having a flange comprising in combination a flexible support provided with means for attachment to the chassis of an automobile frame, said support having an opening of substantially larger size than the brake rod, and a resilient plug having an opening for slidably receiving said brake rod secured to said support, said plug having a countersunk recess for housing the flange of the rod.

3. A support for the brake rod of an automobile of the character specified comprising in combination a flexible support provided with means for attachment to the chassis of an automobile frame, said support having an opening of substantially larger size than the brake rod, and a resilient plug having an opening for slidably receiving said brake rod secured to said support, said plug having channeled portions engaging said support.

4. A support for the brake rod of an automobile of the character specified comprising in combination a flexible support provided with means for attachment to the chassis of an automobile frame, said support having an opening of substantially larger size than the brake rod, and a resilient plug having an opening for slidably receiving said brake rod secured to said support, said plug having a tubular portion extending through and fitting snugly within the opening in said support.

5. A support for the brake rod of an automobile of the character specified comprising a flexible plate with a cushioning member mounted on said plate having an opening through which the brake rod slidably passes.

6. A support for a brake rod having a flange of an automobile of the character specified comprising a flexible plate with a cushioning member mounted on said plate having an opening through which the brake rod passes, said cushioning member having a pocket for receiving the flange on said rod.

7. A support for a brake rod having a flange of an automobile of the character specified comprising a flexible plate with a cushioning member mounted on said plate having an opening through which the brake rod passes, said cushioning member having a pocket for receiving the flange on said rod, said member being composed substantially of rubber.

8. A support for the brake rod of an automobile of the character specified comprising a flexible plate with a cushioning member mounted on said plate having an opening through which the brake rod slidably passes, said plate having an opening therein and said cushioning member having a tubular portion extending through said opening.

HARRY GLASCOCK.